(12) United States Patent
Kim et al.

(10) Patent No.: US 8,197,988 B2
(45) Date of Patent: Jun. 12, 2012

(54) HYDROGEN SUPPLY SYSTEM FOR FUEL CELL

(75) Inventors: Sang Hyun Kim, Gyeonggi-do (KR); Hoon Hee Lee, Seoul (KR); Hyung Ki Kim, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 401 days.

(21) Appl. No.: 11/999,370

(22) Filed: Dec. 4, 2007

(65) Prior Publication Data

US 2010/0167155 A1   Jul. 1, 2010

(30) Foreign Application Priority Data

Jul. 26, 2007 (KR) .................. 10-2007-0074871

(51) Int. Cl.
 *H01M 2/38* (2006.01)
 *H01M 2/40* (2006.01)
 *H01M 8/24* (2006.01)
 *H01M 8/04* (2006.01)
 *E03B 11/00* (2006.01)
 *F17D 1/00* (2006.01)

(52) U.S. Cl. ......... 429/515; 429/462; 137/255; 137/256

(58) Field of Classification Search ............... 429/34, 429/515, 462; 137/255, 256
See application file for complete search history.

(56) References Cited

U.S. PATENT DOCUMENTS 6,651,701 B2   11/2003 Kuriiwa et al.
2002/0100518 A1*  8/2002 Kuriiwa et al. .............. 141/4

FOREIGN PATENT DOCUMENTS

| JP | 2000-012062 | | 1/2000 |
| JP | 2002-222658 | | 8/2002 |
| JP | 2004253258 A | * | 9/2004 |
| JP | 2006-172932 | | 6/2006 |
| KR | 2005035344 A | * | 4/2005 |
| KR | 2005062924 A | * | 6/2005 |

OTHER PUBLICATIONS

Mori et al., "High-pressure Metal Hydride Tank for Fuel Cell Vehicles," IPHE International Hydrogen Storage Technology Conference, Jun. 19-22, 2005, Lucca, Italy.*
Mori, D. et al., "High-pressure Metal Hydride Tank for Fuel Cell Vehicles," SAE Technical Paper 2007-01-2011, 2007, doi:10.4271/2007-01-2011, published Jul. 23, 2007.

* cited by examiner

*Primary Examiner* — Jennifer Michener
*Assistant Examiner* — Eli Mekhlin
(74) *Attorney, Agent, or Firm* — Edwards Wildman Palmer LLP; Peter F. Corless

(57) ABSTRACT

Disclosed is a high pressure tank configured to store hydrogen and includes a metal hydride (MH) tank capable of storing hydrogen, mounted therein. First and second solenoid valves are provided at both ends of the high pressure tank. A fuel cell stack is then connected to the buffer tank so that hydrogen from the high pressure tank or the MH tank is supplied to the stack through the buffer tank.

13 Claims, 6 Drawing Sheets

PRIOR ART

HYDROGEN STORAGE MATERIAL(M) + $H_2$ → METAL HYDRIDE(MH) + $\Delta H$(HEAT GENERATION)

TEMPERATURE RISE DURING HYDROGEN CHARGING (EXOTHERMIC REACTION)

TEMPERATURE DROP DURING HYDROGEN DISCHARGING (ENDOTHERMIC REACTION)

FIG.2

HYDROGEN SUPPLY SYSTEM FOR FUEL CELL

CROSS-REFERENCE TO RELATED APPLICATION

This application claims under 35 U.S.C. §119(a) on Korean Patent Application No. 10-2007-0074871, filed on Jul. 26, 2007, the entire contents of which are incorporated herein by reference.

BACKGROUND (a) Technical Field

The present invention relates to a hydrogen supply system for a fuel cell. More particularly, the present invention relates to a hydrogen supply system for a fuel cell which can compensate for a change in temperature caused by heat generated when a high pressure tank is charged and discharged with hydrogen.

(b) Background Art

In general, fuel cells are devices that convert the chemical energy of a fuel directly into electrical energy by an electrochemical reaction without combustion. Such a fuel cell is a zero emission power generation system used as a power source of a vehicle, a power source of a laser apparatus, and the like.

In the fuel cell, a fuel cell stack comprising a fuel cell assembly in which a plurality of unit cells are stacked and other peripheral components generates electricity with hydrogen supplied to an anode as a fuel gas and oxygen supplied to a cathode as an oxidizing agent.

In a fuel cell vehicle, a hydrogen storage tank is mounted for storing hydrogen supplied from a hydrogen fueling station located outside the vehicle and supplying the hydrogen to the fuel cell stack for generation of electricity.

That is, the hydrogen in the fuel cell is first stored in the hydrogen storage tank mounted in the vehicle and then supplied to the fuel cell stack in which the electricity is generated.

Accordingly, it is necessary to recharge the hydrogen storage tank with hydrogen for continuous generation of electricity in the fuel cell stack. The hydrogen fueling station includes a hydrogen supply tank and a compressor. The compressor is operated to increase the pressure of hydrogen from the hydrogen supply tank and the pressurized hydrogen is supplied to the hydrogen storage tank in the vehicle.

Several methods for hydrogen storage are known. For example, hydrogen can be stored as a liquid hydrogen. It can be stored using high pressure compression. Also it can be stored using a hydrogen storage material such as metal hydride, porous nanostructured material, etc.

Among them, the method involving high pressure compression is prevalently used. The method using the hydrogen storage material has been intensively studied.

FIG. 1 is a schematic diagram showing a fuel supply mode according to the high pressure compression method. As shown in FIG. 1, hydrogen supplied from a hydrogen fueling station 1 is charged to a high pressure hydrogen tank 2, and the hydrogen stored in the high pressure hydrogen tank 2 is supplied to a fuel cell stack, if necessary, by regulating the pressure of the hydrogen by means of a high pressure regulator 3 and a low pressure regulator 4.

In this case, a solenoid valve 5 is provided at one end of the high pressure hydrogen tank 2 and an end plug is mounted at the other end such that the hydrogen is charged through the solenoid valve 5, in which a valve thereof is turned on and off by transmitting an operation signal to the solenoid valve 5.

At present, the hydrogen storage method in the fuel cell system compresses the hydrogen gas at high pressure of 350 bar or 700 bar.

However, this method has a drawback in that as it has a low storage density, the compression pressure must be increased at a given volume and/or the storage volume must be increased at a given compression pressure in order to ensure a long driving distance, which is disadvantageous in view of the stability and the limited space of the vehicle.

Moreover, a temperature rise caused by an influence of the pressure when hydrogen is compressed and stored in the high pressure hydrogen tank poses a safety problem.

FIG. 2 is a diagram showing hydrogen absorption and release by a hydrogen storage material. Heat is generated by an exothermic reaction when hydrogen is stored in the hydrogen storage material, and the hydrogen is released when heat is applied from the outside.

However, while the hydrogen storage material has an advantage in that it provides a high hydrogen storage density compared to the high pressure compression method, it is disadvantageous in view of hydrogen absorption and release rate and heat management compared to the high pressure compression method.

The information disclosed in this Background section is only for enhancement of understanding of the background of the invention and should not be taken as an acknowledgement or any form of suggestion that this information forms the prior art that is already known to a person skilled in the art.

SUMMARY OF THE INVENTION

The present invention has been made in an effort to solve the above problems, and an object of the present invention is to provide a hydrogen supply system for a fuel cell, in which a metal hydride (MH) tank is provided in a high pressure tank and a solenoid valve is installed at both ends of the high pressure tank.

In one aspect, the present invention provides a hydrogen supply system for a fuel cell, comprising: a high pressure tank which is capable of storing hydrogen received from a hydrogen refueling station and includes therein a metal hydride (MH) tank capable of storing hydrogen; first and second solenoid valves provided at both ends of the high pressure tank; a buffer tank connected in parallel to the high pressure tank; and a fuel cell stack connected to the buffer tank so that hydrogen from the high pressure tank or the MH tank is supplied to the stack through the buffer tank. The system is operated such that the hydrogen is charged from the hydrogen refueling station to the high pressure tank and discharged from the high pressure tank through the first solenoid valve, the hydrogen is charged and discharged to and from the MH tank through the second solenoid valve, the hydrogen is discharged from the MH tank as the first and second solenoid valves are simultaneously opened when the hydrogen is charged to the high pressure tank, and the hydrogen discharged from the MH tank is stored in the buffer tank and then supplied to the fuel cell stack.

In a preferred embodiment, the hydrogen in the high pressure tank is discharged as the first and second solenoid valves are simultaneously opened when the hydrogen is charged to the MH tank, and the hydrogen discharged from the high pressure tank is stored in the buffer tank and then supplied to the fuel cell stack.

Preferably, a first temperature sensor is installed at the first solenoid valve to measure the temperature of the high pressure tank when the hydrogen is charged to the high pressure tank and, if the temperature is increased, the second solenoid valve is opened so that the hydrogen of the MH tank is discharged.

Suitably, a second temperature sensor is installed at the second solenoid valve to measure the temperature of the MH tank when the hydrogen is charged to the MH tank and, if the temperature is increased, the first solenoid valve is opened so that the hydrogen of the high pressure tank is discharged.

More preferably, a first pressure sensor is installed at the first solenoid valve, a third pressure tank is installed at the buffer tank, and, if the pressure measured by the first pressure sensor is higher than that measured by the third pressure sensor, the first solenoid valve is opened so that the hydrogen of the high pressure tank is discharged to the buffer tank.

More suitably, a second pressure sensor is installed at the second solenoid valve and, if the pressure of the MH tank measured by the second pressure sensor is higher than that of the high pressure tank measured by the first pressure sensor, the second solenoid valve is opened so that the hydrogen of the MH tank is discharged to the buffer tank.

Moreover, a high pressure regulator and a low pressure regulator are provided between the buffer tank and the fuel cell stack, and the pressure of the hydrogen in the buffer tank is reduced by the high pressure and low pressure regulators and the hydrogen at reduced pressure is supplied to the fuel cell stack.

According to the present systems, hydrogen is to be discharged from the MH tank when hydrogen is charged to the high pressure tank, and hydrogen is to be charged to the MH tank when hydrogen is discharged from the high pressure tank. A temperature change caused by heat generated when the high pressure tank is charged and discharged with hydrogen can be compensated, thus making it possible to provide effective heat management and safety.

It is understood that the term "vehicle", "vehicular" and other similar terms used herein are inclusive of motor vehicles in general, such as passenger automobiles including sports utility vehicles (SUV), buses, trucks, various commercial vehicles, watercraft including a variety of boats and ships, aircraft, and the like. The present systems will be particularly useful with a wide variety of motor vehicles.

Other aspects of the invention are discussed infra.

BRIEF DESCRIPTION OF THE DRAWINGS

FIG. 2 is a diagram showing hydrogen absorption and release by a conventional hydrogen storage material;

Figure 1:
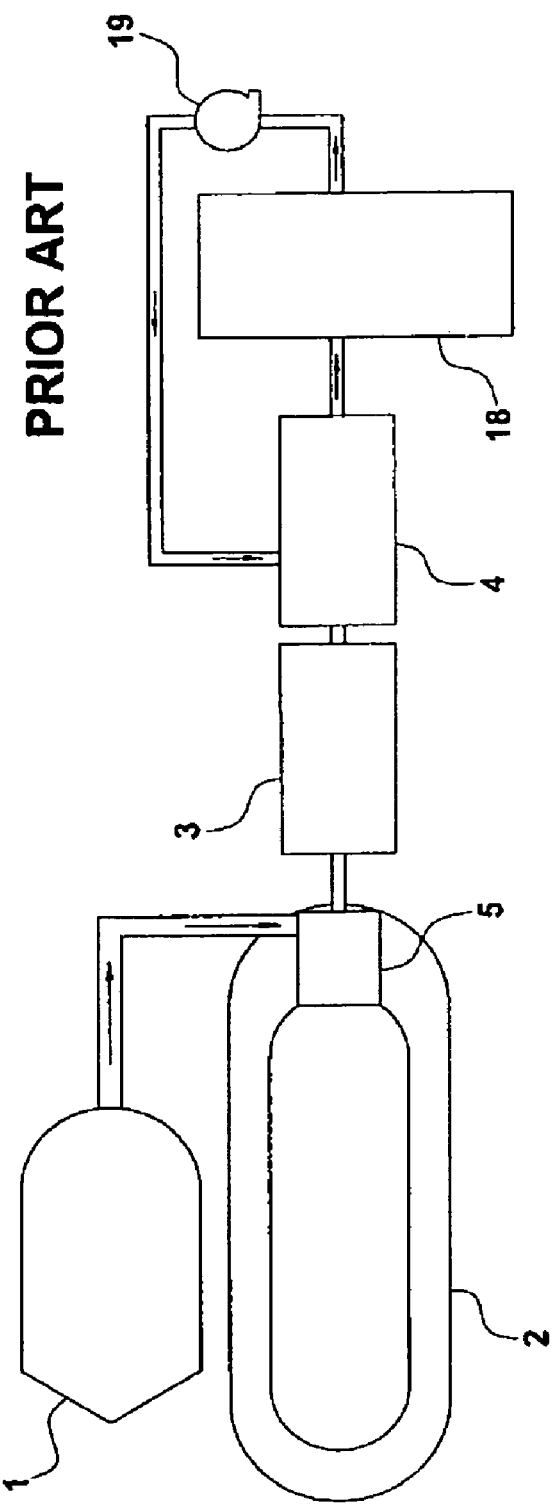
FIG. 1 is a schematic diagram showing a conventional fuel supply system.

Reference numerals set forth in the Drawings includes reference to the following elements as further discussed below:

| 10: | high pressure tank |
| --- | --- |
| 11: | MH tank |
| 12: | buffer tank |
| 13 to 16: | first to fourth solenoid valves |
| 17: | hydrogen refueling station |
| 18: | fuel cell stack |
| 19: | recirculation blower |
| 20: | high pressure regulator |
| 21: | low pressure regulator |

DETAILED DESCRIPTION

Reference will now be made in detail to the preferred embodiment of the present invention, examples of which are illustrated in the drawings attached hereinafter, wherein like reference numerals refer to like elements throughout. The embodiments are described below so as to explain the present invention by referring to the figures.

Figure 3:
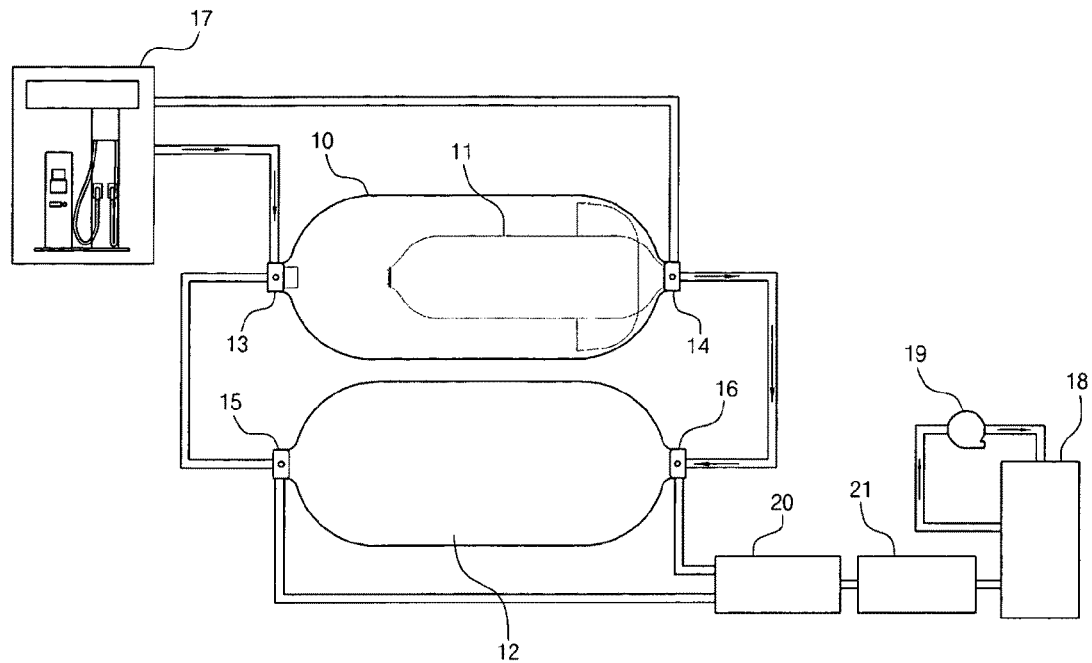
FIG. 3 is a schematic diagram showing hydrogen flow in a hydrogen supply system for a fuel cell in accordance with a preferred embodiment of the present invention during charging of a high pressure tank.
Figure 4:
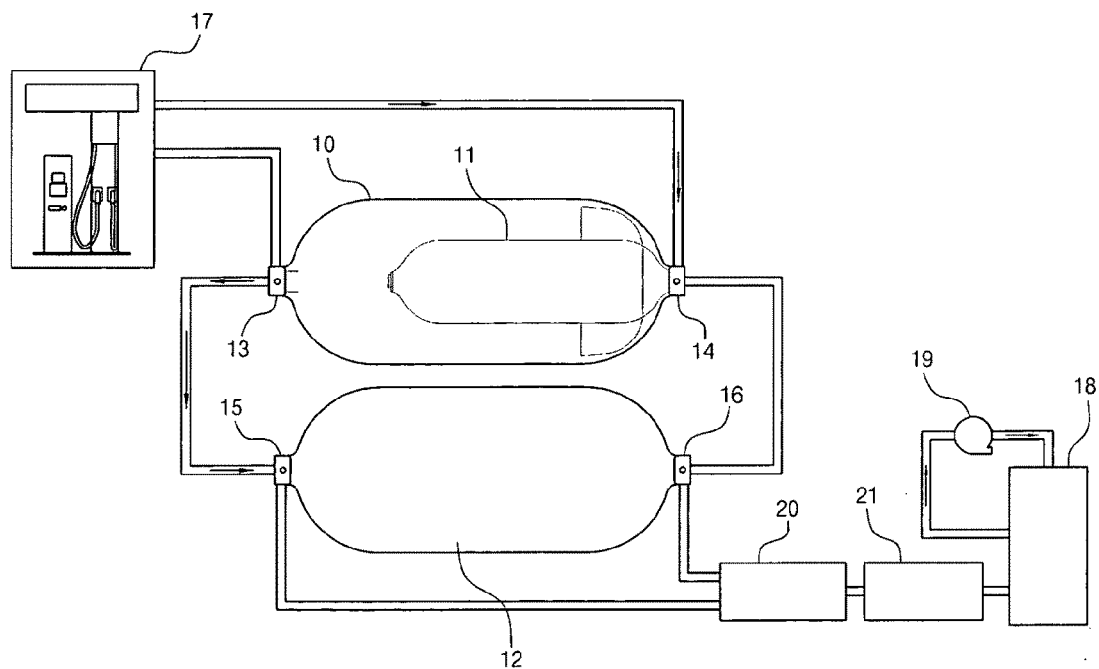
FIG. 4 is a schematic diagram showing hydrogen flow in the hydrogen supply system for a fuel cell in accordance with the preferred embodiment of the present invention during charging of a metal hydride (MH) tank.
Figure 5:
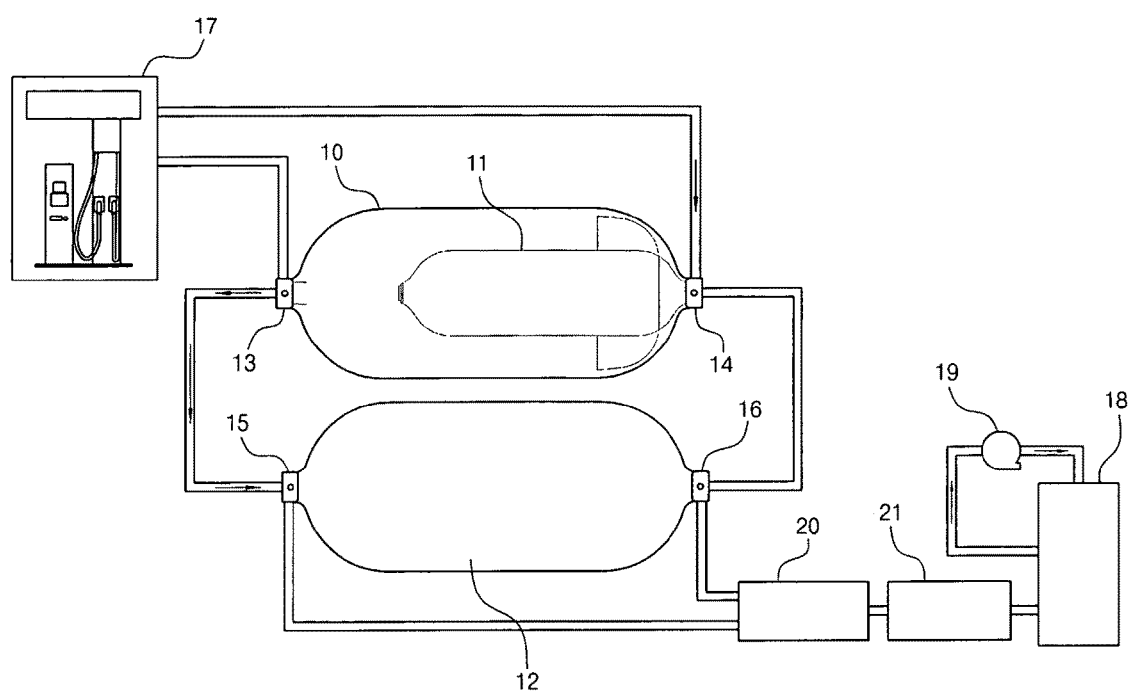
FIG. 5 is a schematic diagram showing hydrogen flow in the hydrogen supply system for a fuel cell in accordance with the preferred embodiment of the present invention.

FIG. 3 is a schematic diagram showing hydrogen flow in a hydrogen supply system for a fuel cell in accordance with a preferred embodiment of the present invention during charging of a high pressure tank, FIG. 4 is a schematic diagram showing hydrogen flow in the hydrogen supply system for a fuel cell in accordance with the preferred embodiment of the present invention during charging of a metal hydride (MH) tank, and FIG. 5 is a schematic diagram showing hydrogen flow in the hydrogen supply system for a fuel cell in accordance with the preferred embodiment of the present invention during operation Hydrogen fuel used in a fuel cell vehicle is generally compressed at a high pressure and stored in a bomb having a predetermined volume space. However, since the distance between the compressed hydrogen gas molecules is long, the amount of the hydrogen gas stored in the bomb is limited, and there arises a problem in view of safety due to a change in temperature caused by heat generated when a high pressure tank 10 is charged and discharged with hydrogen.

Moreover, a metal hydride (MH) is a metal alloy that absorbs and stores hydrogen at a low temperature and releases the stored hydrogen at a high temperature. In the event that hydrogen is stored using the MH, the hydrogen storage capacity is increased; however, the weight of the hydrogen storage alloy is also increased, which results in high energy consumption.

Hydrogen storage tanks in accordance with a preferred embodiment of the present invention include a high pressure tank 10 for storing compressed hydrogen gas, an MH tank 11 using a metal hydride, and a buffer tank 12 storing hydrogen discharged from any one of the high pressure tank 10 and the MH tank 11.

The high pressure tank 10 for storing compressed hydrogen gas is a bomb, commonly used to store compressed hydrogen gas, to which an aluminum liner is mounted by a spinning process and a screwing process.

The MH tank 11 is a hydrogen storage tank mounted in the high pressure tank 10. While the MH tank 11 has a small volume, since the distance between the hydrogen molecules stored in the MH tank 11 is short, the hydrogen storage volume of the MH tank 11 is larger than that of the high pressure tank 10 having the same volume.

The method of mounting the MH tank 11 in the high pressure tank 10 is as follows. First, one end portion of an aluminum liner is processed by a spinning process, an inlet portion (boss region) is subjected to a screwing process, and, then the prepared MH tank 11 is mounted in the high pressure tank 10.

Subsequently, the other end portion of the aluminum liner is subjected to a spinning process, a screwing process, a filament winding process, and a resin curing process, thus completing the mounting process.

A first solenoid valve 13 for opening and closing the high pressure tank 10, a first temperature sensor, and a first pressure sensor are installed at one end of the high pressure tank 10 in which the MH tank 11 is mounted. Moreover, a second solenoid valve 14 for opening and closing the MH tank 11, a second temperature sensor, a second pressure sensor are installed at the other end of the high pressure tank 10.

Moreover, a buffer tank 12 is disposed parallel to the high pressure tank 10 such that hydrogen is to be charged from a hydrogen refueling station 17 to the high pressure tank 10 and discharged from the high pressure tank 10 to the buffer tank 12 through the first solenoid valve 13, and the hydrogen is to be charged from the hydrogen refueling station 17 to the MH tank 11 and discharged from the MH tank 11 to the buffer tank 12 through the second solenoid valve 14.

With the above-described structure, hydrogen is charged to the high pressure tank 10 and, at the same time, discharged from the MH tank 11, or hydrogen is charged to the MH tank 11 and, at the same time, discharged from the high pressure tank 10. Accordingly, the buffer tank 12 is installed such that when hydrogen is supplied to any one of the high pressure tank 10 and the MH tank 11, hydrogen is discharged from the other one.

A third solenoid valve 15 connected to the first solenoid valve 13, a third temperature sensor, and a third pressure sensor are installed at one end of the buffer tank 12. Moreover, a fourth solenoid valve 16 connected to the second solenoid valve 14, a fourth temperature sensor, and a fourth pressure sensor are installed at the other end of the buffer tank 12.

The temperature sensors and the pressure sensors may be installed at solenoid valves 13 to 16.

The operation of the hydrogen supply system for a fuel cell with the above-described structure in accordance with the preferred embodiment of the present invention will be described below.

1) When Charging Compressed Hydrogen Gas to the High Pressure Tank

When the compressed hydrogen gas is charged from the hydrogen refueling station 17 to the high pressure tank 10, the temperature of the inside of the high pressure tank 10 is measured by the first temperature sensor installed at the high pressure tank 10.

If the temperature is increased, a control signal is transmitted to the second solenoid valve 14 provided at the MH tank 11 and the valve 14 is opened so that the hydrogen in the MH tank 11 is discharged to the buffer tank 12.

Accordingly, the temperature increased when the compressed hydrogen is charged to the high pressure tank 10 can be decreased by the hydrogen discharge from the MH tank 11, and the hydrogen stored in the buffer tank 12 is supplied to a fuel cell stack 18.

2) When Charging Compressed Hydrogen Gas to the MH Tank

When the compressed hydrogen gas is charged from the hydrogen refueling station 17 to the MH tank 11, the temperature of the inside of the MH tank 11 is measured by the second temperature sensor installed at the MH tank 11.

If the temperature is increased, a control signal is transmitted to the first solenoid valve 13 provided at the high pressure tank 10 and the valve 13 is opened so that the hydrogen in the high pressure tank 10 is discharged to the buffer tank 12.

Accordingly, the temperature increased when the compressed hydrogen is charged to the MH tank 11 can be decreased by the hydrogen discharge from the high pressure tank 10, and the hydrogen stored in the buffer tank 12 is supplied to a fuel cell stack 18.

3) During Operation

For the operation of the fuel cell system, the fourth solenoid valve 16 provided at the buffer tank 12 is opened such that the pressure of hydrogen is first reduced to, for example, 10 bar by a high pressure regulator 20 and then reduced to, for example, 0.2 bar by a low pressure regulator 21.

Subsequently, the hydrogen gas at a reduced pressure of 0.2 bar is supplied to the fuel cell stack 18, and the hydrogen remaining after reaction with air in the fuel cell stack 18 is recirculated through a recirculation blower 19.

The pressure is monitored by the first and third pressure sensors and, if the pressure of the high pressure tank 10 is higher than that of the buffer tank 12, the first solenoid valve 13 at the high pressure tank 10 is opened.

If the pressure measured by the first and third pressure sensors is lower than that measured by the second pressure sensor at the MH tank 11, the second solenoid valve 14 at the MH tank 11 is opened to discharge the hydrogen stored in the MH tank 11.

While the amount of the hydrogen stored in the MH tank 11 is large, since the pressure of the hydrogen stored in the MH tank 11 is low, the hydrogen is used in the sequential order: (1) the buffer tank 12, (2) the high pressure tank 10, and (3) the MH tank 11 during the operation.

Accordingly, in terms of the high pressure tank 10, since the compression heat generated when the compressed hydrogen gas is charged is reduced by a cooling effect caused when the hydrogen gas is discharged from the MH tank 11, the compressed hydrogen gas can be charged to the high pressure tank 10 at a high speed (it is limited that the temperature in the high pressure tank 10 should not exceed 85° during charging of the high pressure tank 10).

Moreover, in terms of the MH tank 11, the absorption and release of heat generated when the MH tank 11 is charged and discharged with the high pressure hydrogen gas can be compensated by the compression heat and released heat of the high pressure tank 10.

Figure 6:
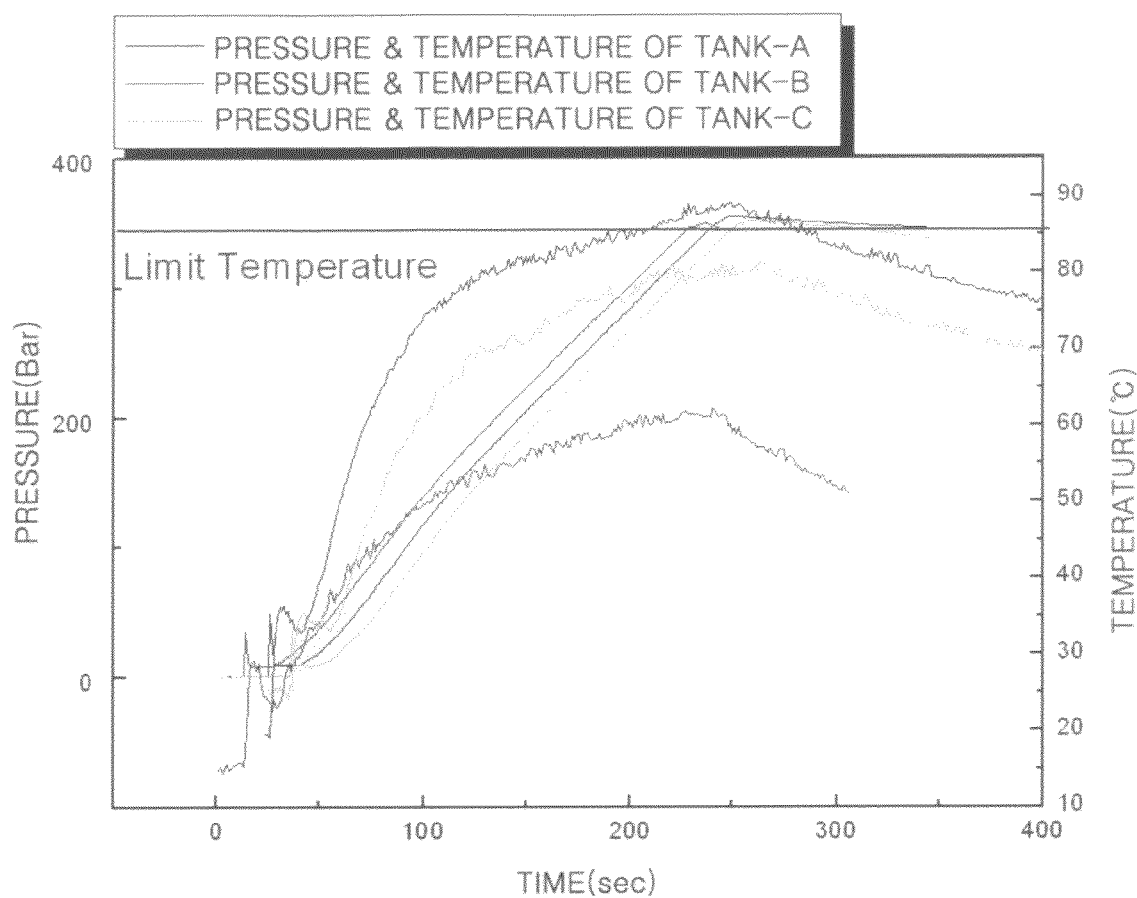
FIG. 6 is a graph showing a temperature rise during high pressure hydrogen charging.

FIG. 6 is a graph showing a temperature rise during high pressure hydrogen charging. The temperature in the tank is increased to 80° C. when the tank is charged for three to four minutes in view of the temperature rise. If the tank is charged within two minutes, which is a standard defined by the Department of Energy (DOE), U.S.A., the temperature will arise more rapidly.

Figure 7:
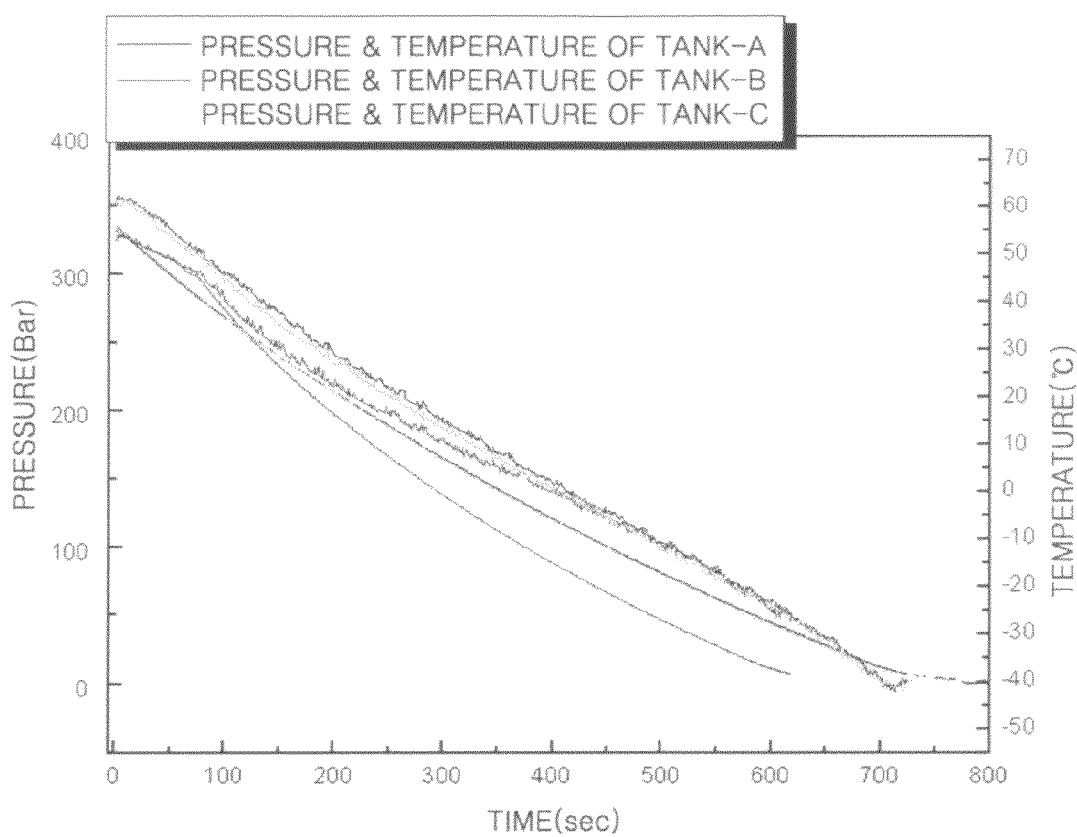
FIG. 7 is a graph showing a temperature drop during high pressure hydrogen discharging.

FIG. 7 is a graph showing a temperature drop during high pressure hydrogen discharging. In the event that the hydrogen stored in the tank is discharged for ten minutes, the temperature will drop to −40° C. and, if the hydrogen is discharged through a larger flow path, the temperature will drop more sharply.

As described above, with the metal hydride (MH) tank mounted in the high pressure tank of the hydrogen supply system for a fuel cell in accordance with the present invention, if the temperature of the high pressure tank is increased during charging of the high pressure tank, the solenoid valve of the MH tank is opened to discharge the hydrogen so that the temperature of the high pressure tank is decreased. If the temperature of the MH tank is increased during charging of the MH tank, the solenoid valve of the high pressure tank is opened to discharge the hydrogen so that the temperature of the high pressure tank is decreased and then compensated by heat generated during charging of the MH tank. Accordingly, it is possible to provide effective heat management and safety, and increase the hydrogen charging speed.

The invention has been described in detail with reference to preferred embodiments thereof. However, it will be appreciated by those skilled in the art that changes may be made in these embodiments without departing from the principles and spirit of the invention, the scope of which is defined in the appended claims and their equivalents.

What is claimed is:

1. A hydrogen supply system for a fuel cell, comprising:
   a high pressure tank having hydrogen stored therein that is received from a hydrogen refueling station, wherein a metal hydride (MH) tank storing hydrogen is disposed within the high pressure tank;
   first and second solenoid valves provided at both ends of the high pressure tank;
   a buffer tank connected in parallel to the high pressure tank; and
   a fuel cell stack connected to the buffer tank wherein the hydrogen supply system is configured to supply hydrogen from the high pressure tank or the MH tank to the fuel cell stack through the buffer tank, and configured to charge the hydrogen from the hydrogen refueling station to the high pressure tank and discharge the hydrogen from the high pressure tank through the first solenoid valve,
   wherein the second solenoid valve is configured to charge and discharge the hydrogen to and from the MH tank,
   wherein the first and second solenoid valves are configured to be simultaneously opened to discharge the hydrogen from the MH tank when the hydrogen is charged to the high pressure tank, and
   wherein the hydrogen discharged from the MH tank is stored in the buffer tank and then supplied to the fuel cell stack.

2. The system of claim 1, wherein the hydrogen in the high pressure tank is discharged as the first and second solenoid valves are simultaneously opened when the hydrogen is charged to the MH tank, and the hydrogen discharged from the high pressure tank is stored in the buffer tank and then supplied to the fuel cell stack.

3. The system of claim 1, wherein a first temperature sensor is installed at the first solenoid valve to measure the temperature of the high pressure tank when the hydrogen is charged to the high pressure tank and, if the temperature is increased, the second solenoid valve is opened to discharge the hydrogen of the MH tank.

4. The system of claim 3, wherein a second temperature sensor is installed at the second solenoid valve to measure the temperature of the MH tank when the hydrogen is charged to the MH tank and, if the temperature is increased, the first solenoid valve is opened to discharge the hydrogen from the high pressure tank.

5. The system of claim 1, wherein a first pressure sensor is installed at the first solenoid valve, a third pressure sensor is installed at the buffer tank, and, if the pressure measured by the first pressure sensor is higher than that measured by the third pressure sensor, the first solenoid valve is opened to discharge the hydrogen from the high pressure tank to the buffer tank.

6. The system of claim 5, wherein a second pressure sensor is installed at the second solenoid valve and, if the pressure of the MH tank measured by the second pressure sensor is higher than that of the high pressure tank measured by the first pressure sensor, the second solenoid valve is opened to discharge the hydrogen from the MH tank is discharged to the buffer tank.

7. The system of claim 1, wherein a high pressure regulator and a low pressure regulator are provided between the buffer tank and the fuel cell stack, and the pressure of the hydrogen in the buffer tank is reduced by the high pressure and low pressure regulators and the hydrogen at a reduced pressure is supplied to the fuel cell stack.

8. A hydrogen supply system for a fuel cell, comprising:
   a high pressure tank storing hydrogen;
   a first solenoid valve provided at the high pressure tank, and configured to charge into or discharge from the high pressure tank hydrogen;
   a metal hydride (MH) tank storing hydrogen, the MH tank being disposed in the high pressure tank;
   a second solenoid valve provided at the MH tank, and configured to charge into or discharge from the MH tank hydrogen;
   a buffer tank connected to the high pressure tank and the MH tank via the first and second solenoid valves, respectively; and
   a fuel cell stack connected to the buffer tank, the buffer tank configured to supply hydrogen to the fuel cell stack.

9. The system of claim 8, wherein a first temperature sensor is installed at the first solenoid valve to measure the temperature of the high pressure tank when the hydrogen is charged to the high pressure tank and, if the temperature is increased, the second solenoid valve is opened to discharge the hydrogen from the MH tank.

10. The system of claim 9, wherein a second temperature sensor is installed at the second solenoid valve to measure the temperature of the MH tank when the hydrogen is charged to the MH tank and, if the temperature is increased, the first solenoid valve is opened to discharge the hydrogen from the high pressure tank.

11. The system of claim 8, wherein a first pressure sensor is installed at the first solenoid valve, a third pressure sensor is installed at the buffer tank, and, if the pressure measured by the first pressure sensor is higher than that measured by the third pressure sensor, the first solenoid valve is opened to discharge the hydrogen from the high pressure tank to the buffer tank.

12. The system of claim 11, wherein a second pressure sensor is installed at the second solenoid valve and, if the pressure of the MH tank measured by the second pressure sensor is higher than that of the high pressure tank measured by the first pressure sensor, the second solenoid valve is opened to discharge the hydrogen from the MH tank to the buffer tank.

13. The system of claim 8, wherein a high pressure regulator and a low pressure regulator are provided between the buffer tank and the fuel cell stack, and the pressure of the hydrogen in the buffer tank is reduced by the high pressure and low pressure regulators and the hydrogen at a reduced pressure is supplied to the fuel cell stack.

* * * * *